(12) United States Patent
Ogawa et al.

(10) Patent No.: US 8,292,333 B2
(45) Date of Patent: Oct. 23, 2012

(54) PIPE JOINTS

(75) Inventors: Yukihiro Ogawa, Aichi-ken (JP); Kenji Tozaki, Aichi-ken (JP)

(73) Assignee: Togo Seisakusyo Corporation, Aichi-ken (JP)

( * ) Notice: Subject to any disclaimer, the term of this patent is extended or adjusted under 35 U.S.C. 154(b) by 474 days.

(21) Appl. No.: 12/524,866

(22) PCT Filed: Jan. 28, 2008

(86) PCT No.: PCT/JP2008/051168
§ 371 (c)(1),
(2), (4) Date: Jul. 29, 2009

(87) PCT Pub. No.: WO2008/093627
PCT Pub. Date: Aug. 7, 2008

(65) Prior Publication Data
US 2010/0007142 A1    Jan. 14, 2010

(30) Foreign Application Priority Data
Jan. 31, 2007 (JP) ................... 2007-020327

(51) Int. Cl.
*F16L 39/00* (2006.01)
(52) U.S. Cl. ...................... 285/319; 285/305
(58) Field of Classification Search .......... 285/319, 285/305
See application file for complete search history.

(56) References Cited

U.S. PATENT DOCUMENTS

| | | | | |
|---|---|---|---|---|
| 7,464,970 B2 * | 12/2008 | Yamada et al. | | 285/305 |
| 7,527,303 B2 * | 5/2009 | Furuya | | 285/305 |
| 7,566,077 B2 * | 7/2009 | Tsurumi | | 285/93 |
| 7,823,930 B2 * | 11/2010 | Feger et al. | | 285/319 |
| 2002/0084652 A1 * | 7/2002 | Halbrock et al. | | 285/305 |
| 2005/0087981 A1 * | 4/2005 | Yamada et al. | | 285/81 |
| 2006/0267341 A1 * | 11/2006 | Takayanagi | | 285/305 |
| 2007/0273150 A1 | 11/2007 | Tsurumi | | |

FOREIGN PATENT DOCUMENTS

| | | |
|---|---|---|
| CN | 2394079 Y | 8/2000 |
| JP | 49-37044 | 10/1974 |
| JP | 58-152996 A | 9/1983 |
| JP | 06-207696 | 7/1994 |
| JP | 7-31154 | 6/1995 |
| JP | 2005-172161 | 6/2005 |
| JP | 2006-183833 | 7/2006 |
| JP | 2006-234024 | 9/2006 |

\* cited by examiner

*Primary Examiner* — Aaron Dunwoody
(74) *Attorney, Agent, or Firm* — Patterson Thuente Christensen Pedersen, P.A.

(57) ABSTRACT

An inlet hole capable of inserting a pipe thereinto is formed in a pipe joint body along an axis. Retainer attaching holes for attaching with a retainer that prevents detachment of the pipe are formed in a side surface of the pipe joint body to extend therethrough. These retainer attaching holes are configured symmetrically with respect to an X axis passing through a center of the inlet hole as a symmetrical axis. Thus, a circumference of the inlet hole opens symmetrically, so that the heat shrinkage condition after molding is equalized in the circumferential direction. Accordingly, it is not necessary to process a molding pin for the inlet hole with imbalance of heat shrinkage amount in mind, so that the molding pin becomes easy to process. In addition, the retainer can selectively utilize the retainer attaching holes at two positions, so that selective use depending on installation environment can be achieved.

6 Claims, 16 Drawing Sheets

PIPE JOINTS

PRIORITY CLAIM

The present application is a National Phase entry of PCT Application No. PCT/JP2008/051168, filed Jan. 28, 2008, which claims priority from Japanese Application No. 2007-020327, filed Jan. 31, 2007, the disclosures of which are hereby incorporated by reference herein in their entirety.

TECHNICAL FIELD

The present invention relates to pipe joints.

BACKGROUND ART

Pipe joints for connecting metal fuel pipes or tubes used for fuel supply systems of automobiles or the like are conventionally known. As this kind of pipe joint, for example, one disclosed in Japanese Laid-Open Patent Publication No. 2005-172161 has been known.

The above pipe joint has an inlet along an axis of a pipe joint body in order to receive a pipe. The pipe inserted into the inlet is engaged with a retainer, a bulge portion of which protrudes through the pipe joint body, and thus is held in the pipe joint.

Patent Document 1: Japanese Laid-Open Patent Publication No. 2005-172161

Because the retainer is attached to the pipe joint body from a radial direction, retainer attaching holes are opened in a side surface. These openings are generally located within a substantially half circumferential length, and the remaining half is configured as a closed wall surface.

The pipe joint body is integrally molded from a synthetic resin. A part corresponding to the inlet hole in a mold for molding the pipe joint body is configured to have a pin shape (molding pin). A cross section of the inlet is circular, so that it is thought that a cross section of the molding pin is preferably circular.

However, as mentioned above, the retainer attaching holes are formed in only half of the side surface of the pipe joint body. Therefore, the half is an open area and the remaining half is a closed area, so that heat shrinkage immediately after molding is considerably different between the open side and the closed side. Naturally, the closed area is largely affected by the heat shrinkage, and therefore, if the molding pin is formed to have an accurate circle, formation of a circular inlet hole may be inhibited by the heat shrinkage after molding. That is, the shape of the molding pin should be designed with influence of the heat shrinkage in mind. More specifically, the shape of the molding pin has been configured such that a part corresponding to the open area is a perfect circle and a part corresponding to the closed area is a substantially ellipse bulging outwardly. However, it is never easy to manufacture the molding pin into the aforementioned shape, so that it is desired to resolve it earlier.

SUMMARY OF THE PRESENT INVENTION

In accordance with a first aspect of the invention, a pipe joint has a pipe joint body and a retainer. With respect to the pipe joint, an inlet hole where a pipe body can be inserted into is formed along an axis, and retainer attaching holes communicating with the inlet hole are formed so as to open in a side surface. The retainer is attached to the retainer attaching hole from a direction intersecting with the axis and detachably engages with the pipe body by entering into and leaving from the inlet hole. A plurality of open regions including the retainer attaching holes are disposed in substantially symmetrical manner with respect to the axis.

The plurality of the open regions including the retainer attaching holes are disposed symmetrically in a plane perpendicular to the axis of the pipe joint body, so that areas including molded thickness and thin areas are distributed substantially evenly along the whole circumference in the side surface of the pipe joint body. Therefore, a condition of heat shrinkage immediately after molding is equalized in the circumferential direction of the pipe joint body, so that it is not necessary to precisely manufacture the mold with difference of shrinkage rate in mind as a conventional way, so that it is able to make manufacture of the mold easy.

In one embodiment, each of the open regions is formed to have the same shape as the retainer attaching hole, so that the retainer can be attached selectively to any of the open regions.

Because the retainer can be attached to any of the open regions, it is able to select an optimum one of open regions depending on an installation environment of the pipe joint, so that usability is improved.

In another embodiment, adjacent circumferential edges of the retainer attaching holes and the open regions are connected to each other via connecting pieces, respectively, whereas a concave portion selectively fitting with the connecting piece and positioning the retainer is formed on the retainer.

A plurality of openings that the retainer can be attached to are formed in the circumference of the pipe joint body, so that there is a problem that strength of the pipe joint body would decrease compared with the known one. As a measure against it, opposed circumferential edges in any of the retainer attaching hole and the open regions are connected by the connecting pieces, so that it is able to effectively prevent decrease of strength. Furthermore, when the retainer is attached, such connecting pieces can position the retainer by fitting with the concave portion.

In the other embodiment, with respect to any of the retainer attaching holes and the open regions, the retainer can move between a temporary engaging position where the pipe body can be inserted into and removed from the inlet hole and a regular engaging position where the pipe body is held in the inlet hole by engagement with the bulge portion. In addition, detection claws are flexibly formed on ends of a pair of holding legs formed on the retainer. When the retainer is in the temporary engaging position, the detection claws formed on the ends of the pair of the holding legs are in a condition of protruding into the inlet hole through temporary engaging holes open in the pipe joint body. Here, when the pipe body is inserted into the inlet hole to reach a fixing position, the detection claw slidably contacts with a bulge portion formed so as to protrude from an outer surface of the pipe body and moves outwardly from the temporary engaging holes in order to allow movement of the retainer from the temporary engaging position to the regular engaging position. The temporary engaging holes are formed in the pipe joint body to be opposed diametrically, and the open regions and the retainer attaching hole are disposed symmetrically with respect to an axis corresponding to the diameter. Accordingly, when any of the retainer attaching holes and the open regions are selected, the detection claws are fitted into the temporary engaging holes, and the retainer can be held in the temporary engaging position.

By disposing the pair of the temporary engaging holes in an opposing manner in the radial direction, when the retainer selects any of the retainer attaching holes and the open regions, the retainer can use the same temporary engaging holes. Therefore, it is not necessary to provide excessive openings in the pipe joint body, so that it is able to minimize decrease of strength.

In accordance with a second aspect of the invention, a pipe joint has a pipe joint body made from synthetic resin and a retainer. The pipe joint has an axis, an inlet hole provided along the axis and allowing a pipe body to be inserted therein, and a side wall. A plurality of retainer attaching holes communicating with the inlet hole are formed in the side wall. Whereas, the retainer has a leg portion capable of being inserted into and removed from the retainer attaching holes. When the leg portion of the retainer protrudes into the inlet hole through the attaching holes, the pipe body is engaged by the leg portion and is prevented from leaving from the pipe joint body. When the leg portion of the retainer is removed from the inlet hole, the pipe body is allowed to leave from the pipe joint body. Here, the plurality of the retainer attaching holes allow the leg portion of the retainer to be inserted into and removed from the pipe joint body in a vertical direction with respect to the axis. In addition, the plurality of the retainer attaching holes are disposed along the axis and at the same intervals in a circumferential direction of the side wall.

In one embodiment, the retainer attaching holes are formed on a plane perpendicular to the axis.

In another embodiment, at least two of the retainer attaching holes are formed not to be aligned with each other in the axial direction of the pipe joint.

In another embodiment, the pipe joint body has four retainer attaching holes, and the retainer attaching holes are disposed at intervals of 90 degrees in the circumferential direction of the pipe joint body.

In the other embodiment, the leg portion has at least two legs, whereas each of the retainer attaching holes is composed of at least two openings. Here, the legs are inserted into the corresponding openings, respectively.

Figure 1:
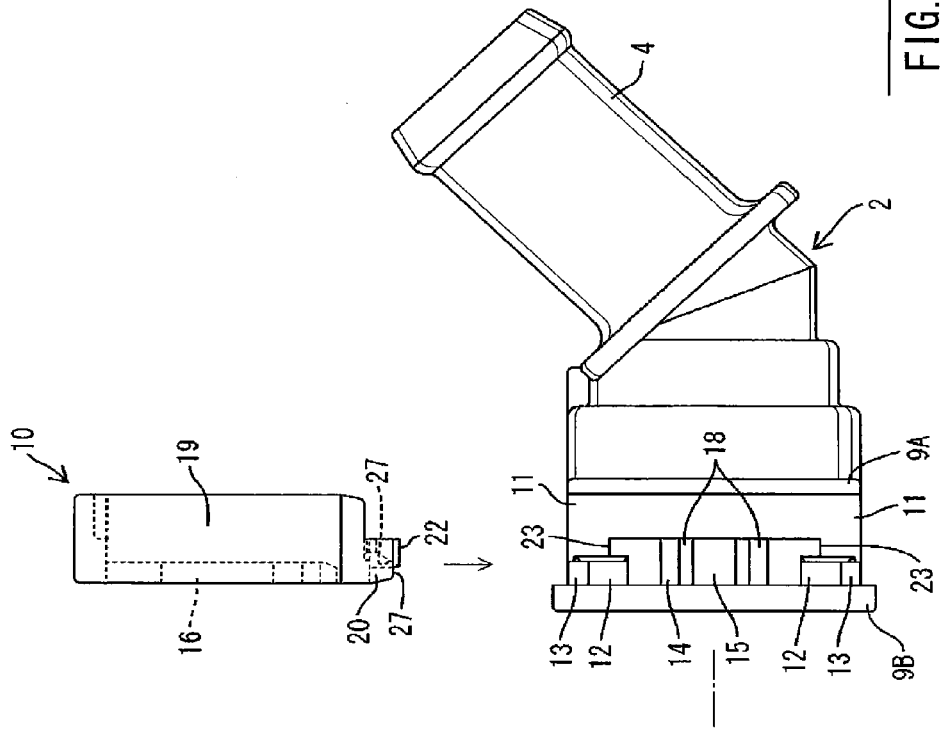
FIG. 1 is a side view showing an exploded state of a pipe joint according to a first embodiment.
Figure 1:
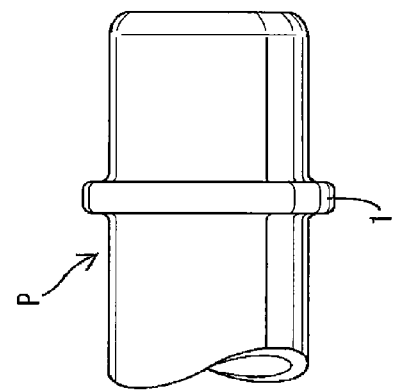

EXPLANATIONS OF LETTERS OR NUMERALS 1 bulge portion
2 pipe joint body
3 inlet hole
10 retainer
12 retainer attaching hole
15 temporary engaging hole
16 engaging leg
P pipe (pipe body)

DETAILED DESCRIPTION OF THE INVENTION

A first embodiment of the present invention will be described in reference to FIG. 1 through FIG. 10. In FIG. 1, a bulge portion 1 is formed on a pipe (pipe body) P made from synthetic resin or metal so as to protrude along a whole circumference. Whereas, a pipe joint body 2 integrally made from a synthetic resin is obliquely bent at a central region with respect to a longitudinal direction. This pipe joint body 2 is formed into a tubular shape, inside of which an inlet hole 3 with a circular cross section passes through along an axis of the pipe joint body 2. The pipe P can be inserted into the inlet hole 3 from one end side of the pipe joint body 2, whereas a pipe connecting portion 4 capable of connecting with a piping member such as a tube, a hose or a pipe not shown is formed on the other end side.

Figure 3:
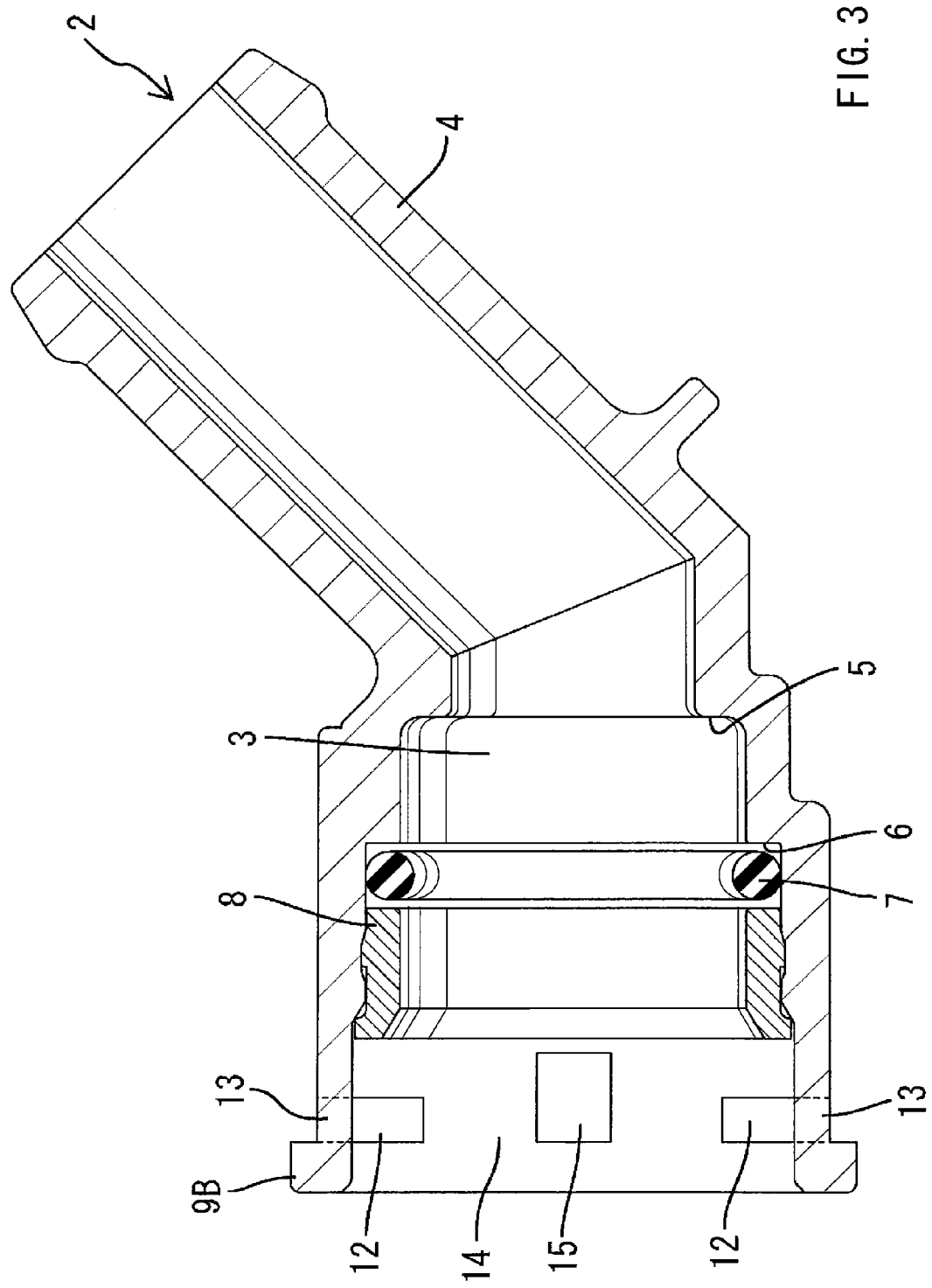
FIG. 3 is a side sectional view of the pipe joint body.

As shown in FIG. 3, a front stop surface 5 for contacting with and stopping a front end of the pipe P inserted into the inlet hole 3 is formed in a stepped manner on a base portion of the pipe connecting portion 4 at an inside of the pipe joint body 2. A seal engaging surface 6 is formed in a stepped manner along a whole circumference of a hole wall between the front stop surface 5 and an inserting side end of the pipe P and serves as a stopper for a sealing O-ring 7 closely contacting with an outer circumferential surface of the pipe P. And, a seal holder 8 made from synthetic resin and engaging with the hole wall of the inlet hole 3 not to move in the axial direction is disposed proximal to the O-ring 7, so that removal of the O-ring 7 is prevented.

Figure 2:
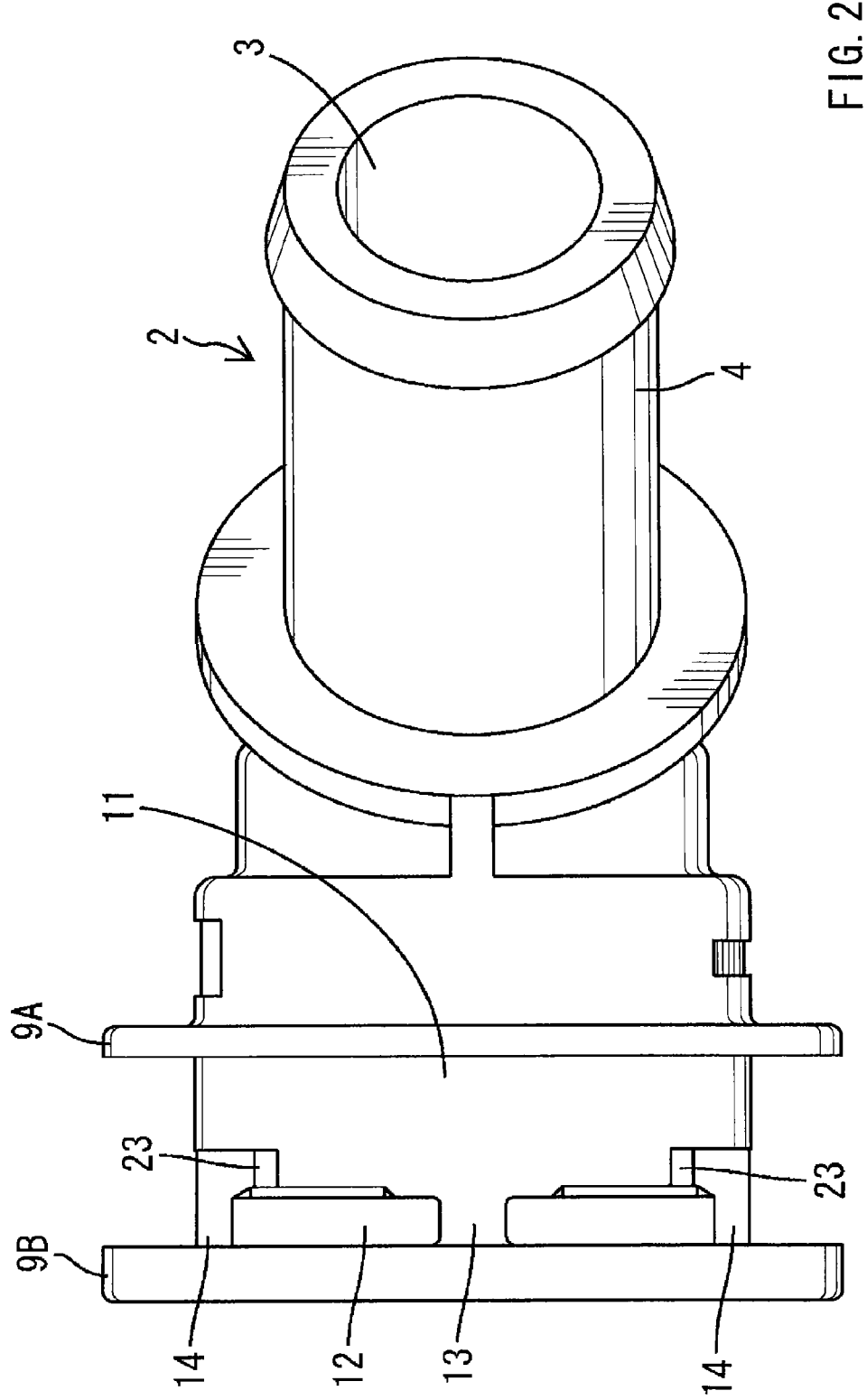
FIG. 2 is a plan view of a pipe joint body.
Figure 4:
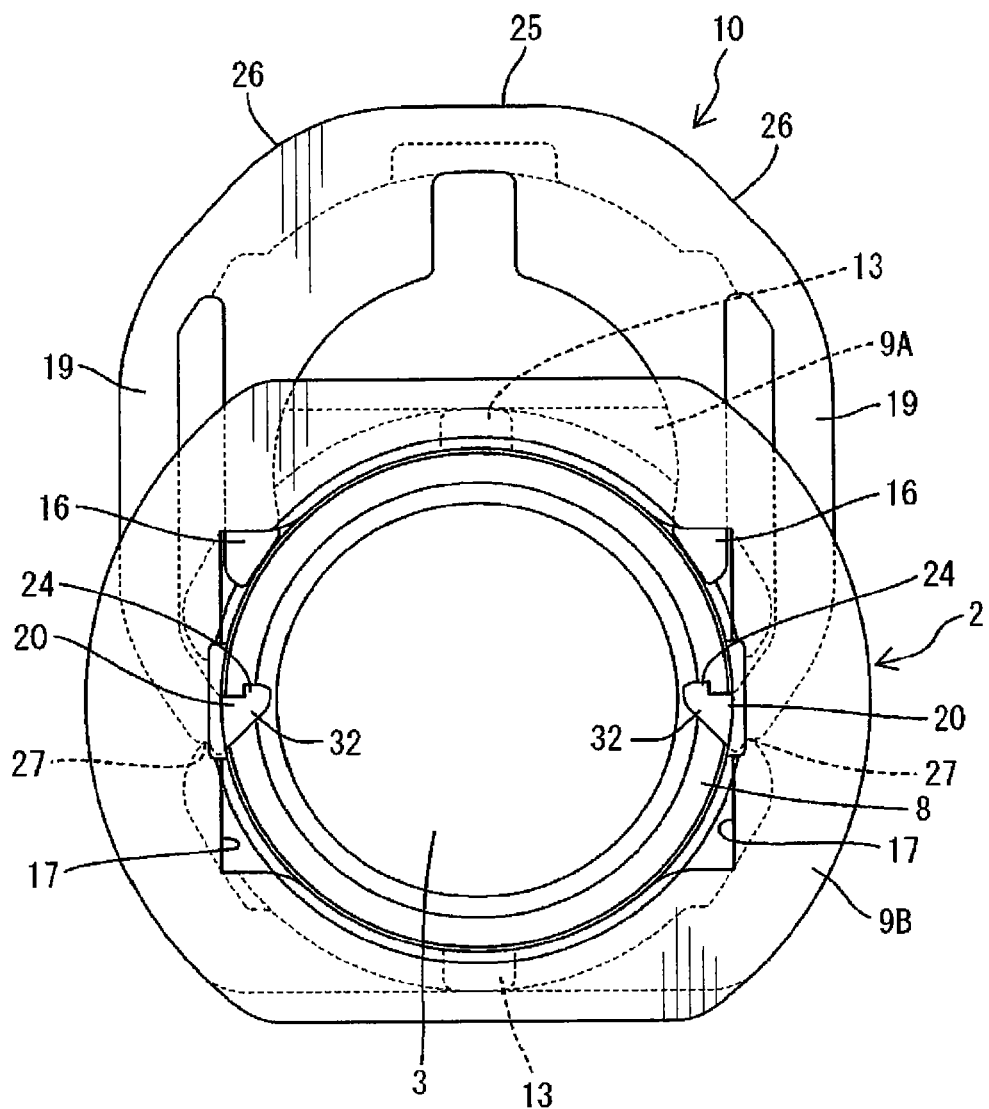
FIG. 4 is a front view of the pipe joint as viewed when a retainer is in a temporary engaging position.
Figure 5:
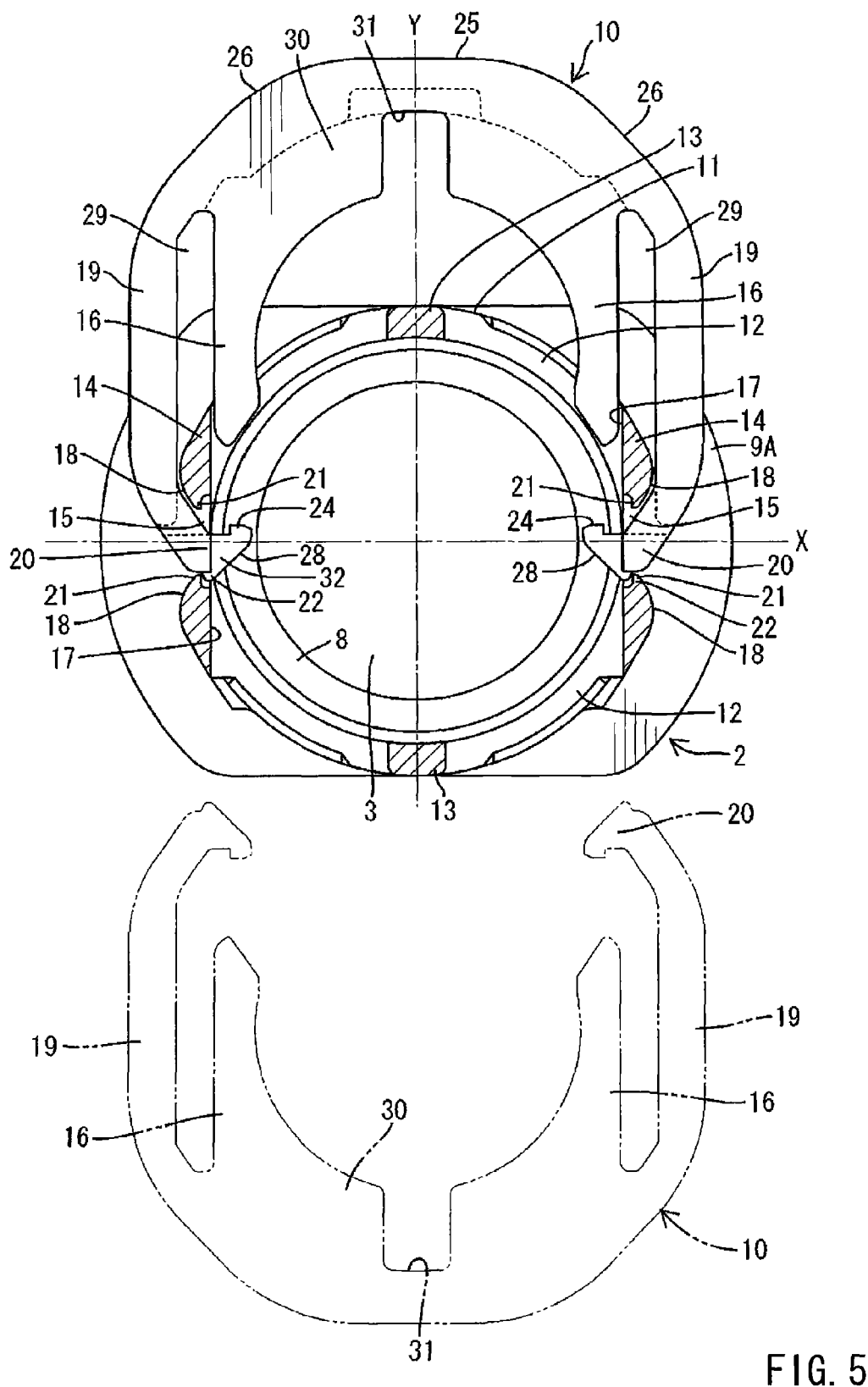
FIG. 5 is a front sectional view as viewed when the retainer is in the temporary engaging position.
Figure 6:
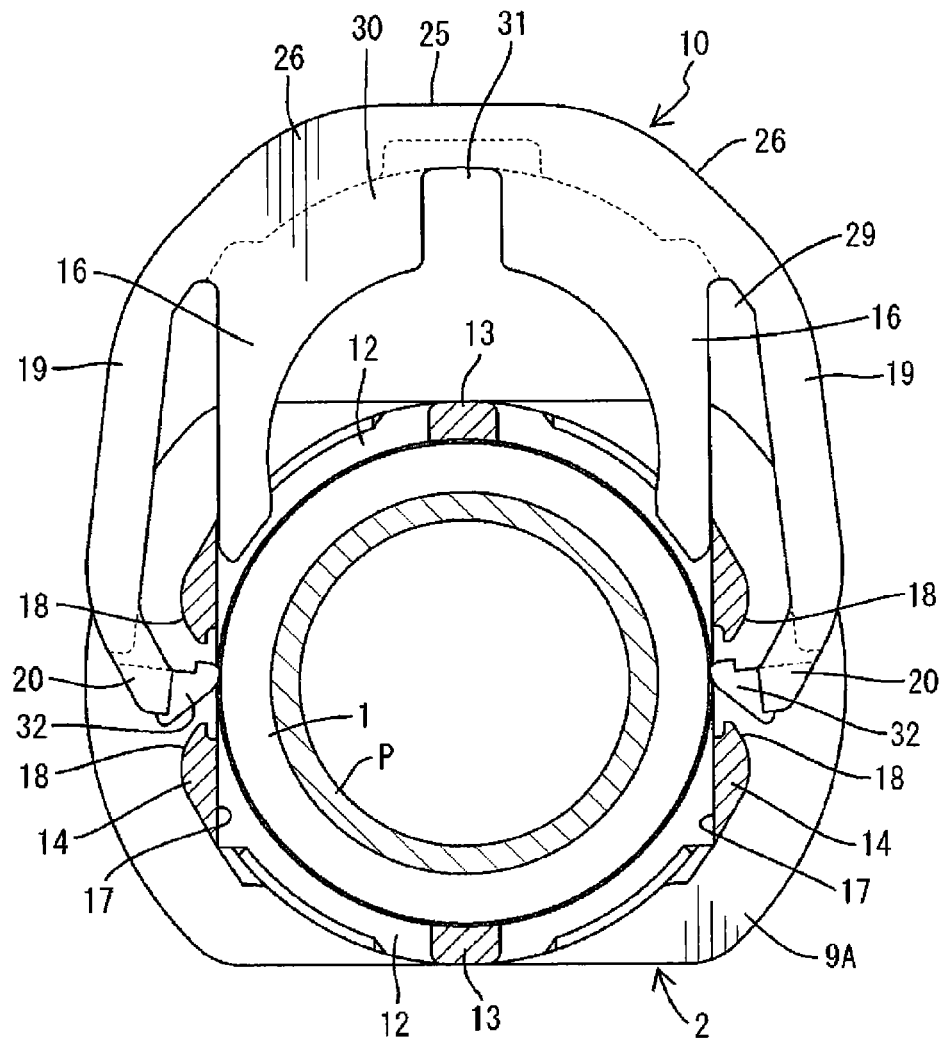
FIG. 6 is a front sectional view showing a state that the retainer is in the temporary engaging position as viewed when a pipe is inserted to reach a fixing position.
Figure 7:
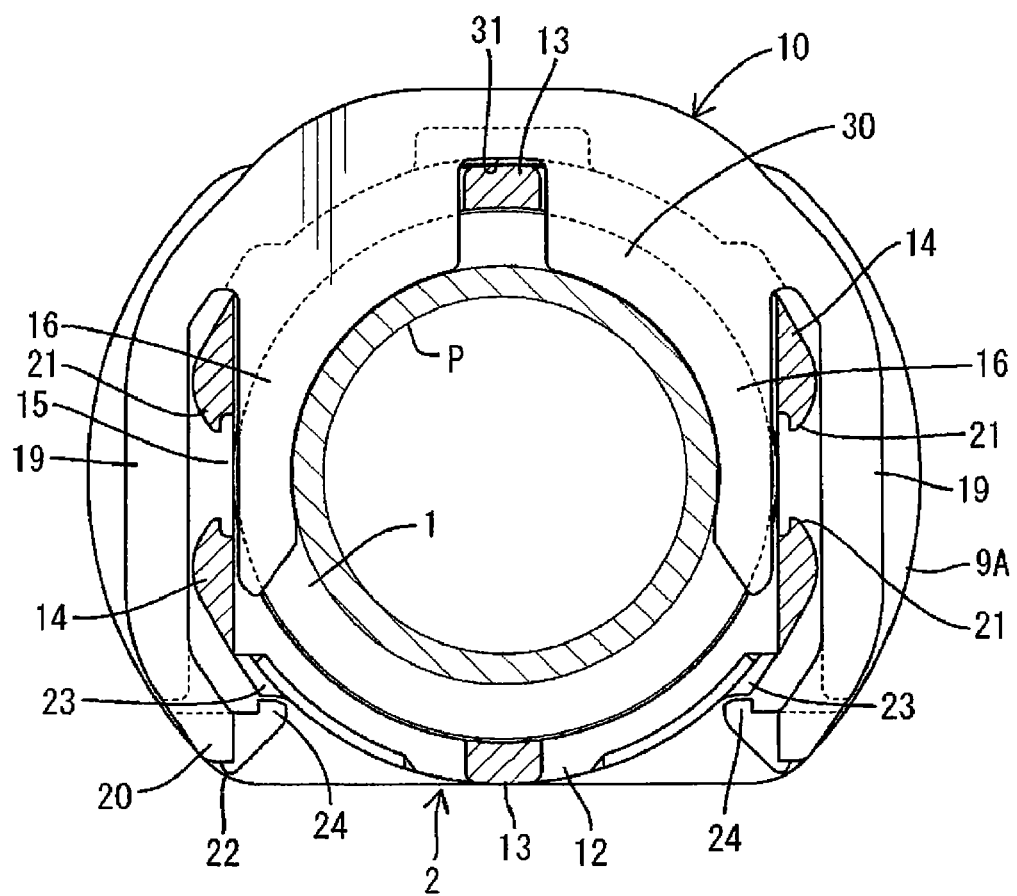
FIG. 7 is a front sectional view showing a state that the retainer is in a regular engaging position.
Figure 8:
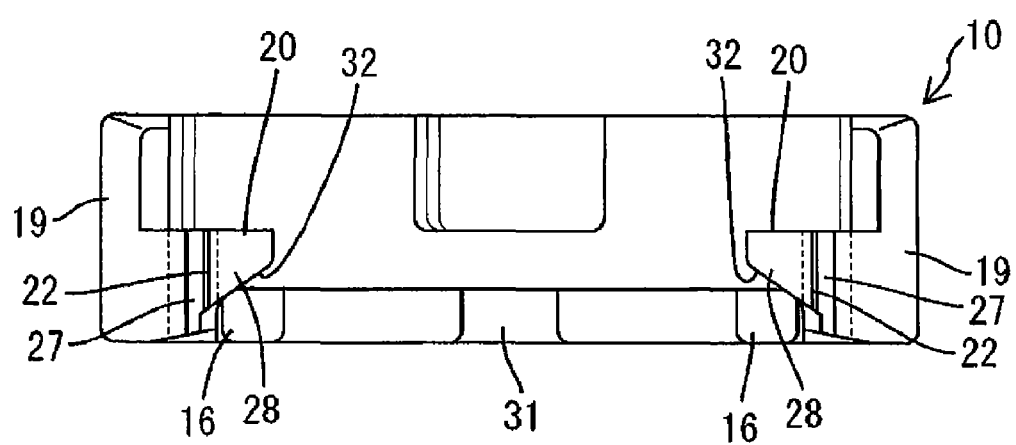
FIG. 8 is a bottom view of the retainer.
Figure 9:
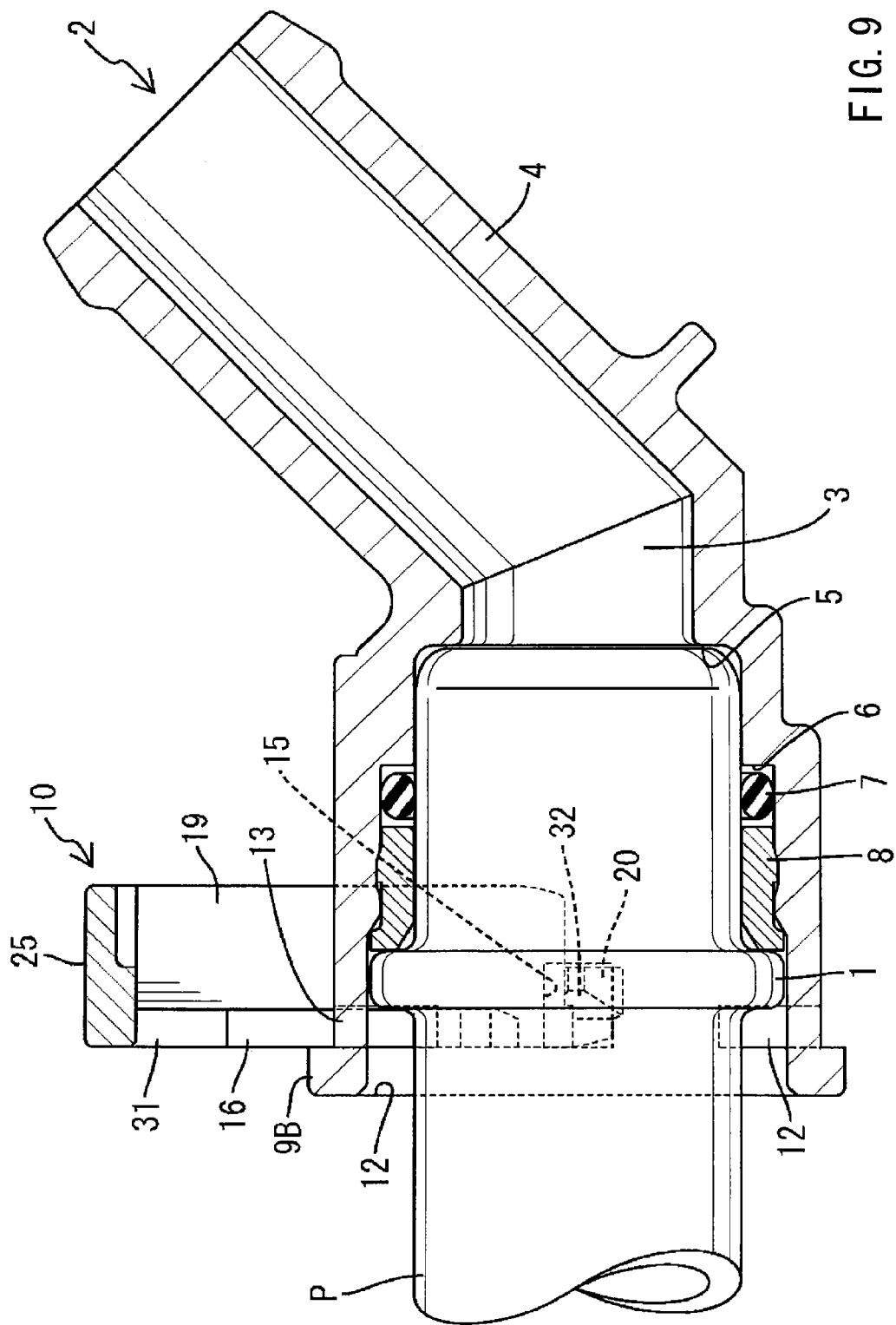
FIG. 9 is a side sectional view showing an insertion state of the pipe as viewed when the retainer is in the temporary engaging position.
Figure 10:
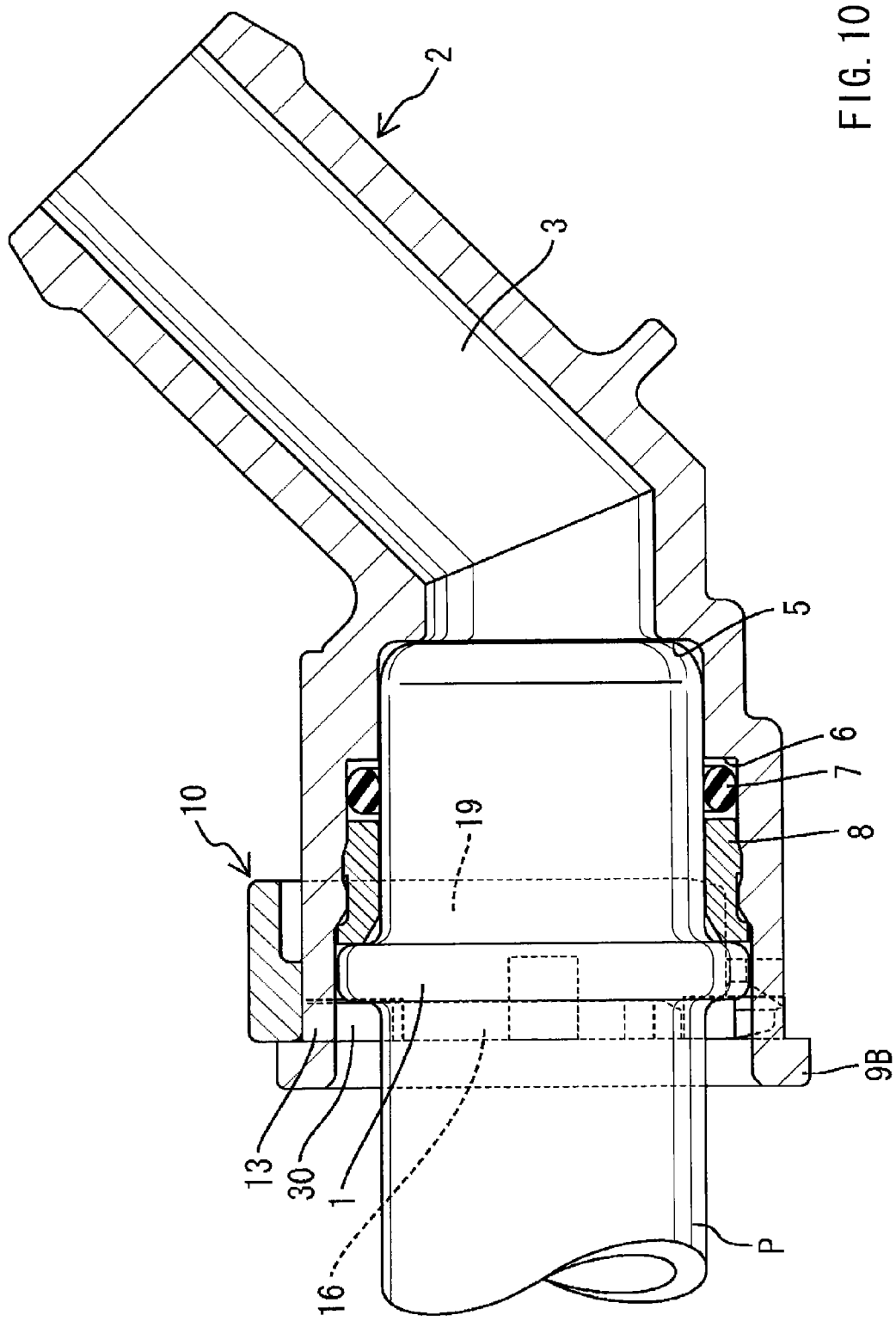
FIG. 10 is a cross sectional view showing an engaging state of the pipe as viewed when the retainer is in the regular engaging position.

As shown in FIG. 2, a pair of flanges 9A and 9B is formed on an end portion on a side for inserting the pipe P so as to extend from an outer surface of the pipe joint body 2. An outer surface portion of the pipe joint body 2 located between these flanges 9A and 9B is configured as an attaching portion 11 for attaching a retainer 10 thereto as described later. As shown in FIG. 5, the retainer can be attached from above and below. And, both of the flanges 9A and 9B serve to guide when the retainer 10 is attached from either direction. As shown in FIG. 4, the flanges 9A and 9B are formed to have substantially oval shapes, respectively, and are configured such that their linear portions are disposed at edges corresponding to directions, in which directions the retainer 10 can be attached (upward and downward in FIG. 4).

As shown in FIG. 5, the retainer attaching portion 11 is formed to be symmetric with respect to a horizontal axis (X axis) and a vertical axis (Y axis) passing through a center of the pipe joint body 2. In particular, the retainer attaching portion 11 has two slits extending by a predetermined angle, each of which defines a retainer attaching hole 12. Hereafter, the retainer attaching hole 12 positioned above the X axis in FIG. 5 will be described. The retainer attaching hole 12 opens along the flange 9B and has a connecting piece 13 formed by connecting opposite circumferential edges at a position locating on the Y axis, so that reinforcement of the pipe joint body 2 is achieved.

A pair of temporary engaging holes 15 for holding the retainer 10 in a temporary engaging position (a position shown in FIG. 5) open so as to be opposed at opposite positions on the X axis in the retainer attaching portion 11. And, a pair of side wall portions 14 are formed so as to be opposed on either side of the temporary engaging holes 15. Hereinafter, description will be made to one set of the side wall portion 14 and the temporary engaging hole 15. A width of the temporary engaging hole 15 is configured to be broader than a width of the retainer attaching hole 12 (refer to FIG. 1) and is positioned on the side of the flange 9B disposed at an end side. The retainer attaching hole 12 is configured to allow an engaging leg 16 to enter thereinto when the retainer 10 is attached to the pipe joint body 2. However, in order to guide the retainer 10 to a regular engaging position, a guide surface 17 is formed on an inner surface of the side wall portion 14 along an entering direction of the retainer 10, that is, parallel to the Y axis.

In addition, the side wall portion 14 has a lead surface 18 at a region adjacent to the temporary engaging hole 15. The lead surface 18 facilitates movement of a detection claw 20 formed on a leading end of a detection leg 19 of the retainer 10 to the temporary engaging position and from the temporary engaging position. In addition, the side wall portion 14 has a hook edge 21 adjacent to the lead surface 18. When the retainer 10 is in the temporary engaging position, the hook edge 21 engages with a temporary engaging projection 22 formed on a lower end of the detection claw 20, however this engagement is set to be released by a weak force. Furthermore, the side wall portion 14 has a regular engaging projection 23 at a substantially central region between both flanges 9A and 9B and on the side of an end of the retainer attaching hole 12. This regular engaging projection 23 engages with a regular engaging edge 24 of the retainer 10 in order to hold the retainer 10 in the regular engaging position (a position shown in FIG. 7).

Next, the retainer 10 will be described. The retainer 10 is integrally formed from a synthetic resin. The retainer 10 has a width substantially equal to a distance between the flanges 9A and 9B. And, the retainer 10 has a substantially arch shape and can be fittingly attached to the outer surface of the retainer attaching portion 11. Here, a top side of the arch is referred to as upper, and a side of both ends of the arch is referred to as lower. A top surface of the retainer 10 is configured as a flat press surface 25, and shoulder portions 26 obliquely extend continuously from opposite ends of this press surface 25, and a pair of the detection legs 19 is formed downwardly from both shoulder portions 26. Both of the detection legs 19 are configured to allow flexural deformation in inner and outer directions, and a width of their leading ends is about half a width of the shoulder portion 26, and they are positioned on the side of the flange 9B. Furthermore, the detection claws 20 detachably fitted into the temporary engaging holes 15 are formed so as to protrude from an inner surface of the retainer 10. Portions having the detection claws 20 formed thereon are obliquely bent inwardly and are configured to fit with the lead surfaces 18 of the pipe joint body 2 when the retainer 10 is held in the temporary engaging position.

In addition, when the retainer 10 is held in the temporary engaging position, both of the detection claws 20 protrude into the inlet hole 3 and can interfere with the bulge portion 1 of the pipe P inserted into the inlet hole 3. Guide surfaces 32 are formed in tapered shapes on parts of the detection claws 20 engaging with the bulge portion 1. When a pressing force from the bulge portion 1 is applied to the guide surfaces 32 during insertion of the pipe P to reach a fixing position within the inlet hole, force components are produced to spread both of the detection legs 19 outwardly, so that engagement between the hook edges 21 and the temporary engaging projections 22 is released, and the detection claws 20 are displaced away from the temporary engaging holes 15 in order to allow movement to the regular engaging position. By contraries, unless the pipe P is not inserted to reach the fixing position, restricting surfaces 27 formed horizontally on lower surfaces of the detection claws 20 continue to engage with circumferential edges of the temporary engaging holes 15, so that the retainer 10 is prevented from moving to the regular engaging position.

Furthermore, relief surfaces 28 composed of inclined surfaces are formed on inner sides of the lower surfaces of the detection claws 20. The relief surfaces 28 are designed to facilitate slidable contact with outer surfaces of the side walls 14 when the retainer 10 is attached to the temporary engaging position and when it is moved from the temporary engaging position to the regular engaging position. In addition, the aforementioned temporary engaging projections 22 are formed at lower ends of the detection claws 20 so as to have the same width as the detection claws 20, and on the other hand, the regular engaging edges 24 are formed on leading ends of upper surfaces of the detection claws 20 so as to protrude upwardly.

A pair of the engaging legs 16 are formed on inner sides of the detection legs 19 in the retainer 10 by way of slits 29, and base portions of the engaging legs 16 define a holding surface 30 protruding from the upper surface of the retainer 10. When the retainer 10 is in the regular engaging position, the engaging legs 16 and the holding surface 30 enter into the inside of the inlet hole 3 and engage with the bulge portion 1 of the pipe P, and thus prevention of removal of the pipe P is achieved. However, when the retainer 10 is in the temporary engaging position, the engaging legs 16 and the holding surface 30 are positioned outside of a passing area of the bulge portion 1 during insertion of the pipe P, and therefore, when the retainer 10 is in the temporary engaging position, the pipe P can be inserted into and removed from the inlet hole 3. In addition, the engaging legs 16 and the detection claws 20 are disposed to be offset back and forth with respect to the axial direction, and in particular, the detection claws 20 are disposed forwardly of the engaging legs 16 with respect to the insertion direction of the pipe P.

A cutout concave portion 31 is formed in a central region of the holding surface 30 and engages with the connecting piece 13 in order to avoid mutual interference when the retainer is in the regular engaging position, while it can prevent the retainer 10 from displacing in a width direction when the retainer 10 is in the regular engaging position.

Next, operations and effects of this embodiment configured as above will be concretely described. In order to attach the retainer 10 to the pipe joint body 2 at the temporary engaging position, after selecting any of the retainer attaching holes 12, firstly the leading ends of the engaging legs 16 are shallowly inserted into the retainer attaching holes 12. And at the same time, the relief surfaces 28 of the detection legs 19 are brought to contact with the outer surface of the pipe joint body 2, so that the press surface 25 is strongly pressed. Then, both of the detection legs 19 are deformed so as to spread, so that the whole retainer 10 is gradually pressed downwardly relative to the pipe joint body 2, and when the detection claws 20 reach to the temporary engaging holes 15, the detection claws 20 fit into the temporary engaging holes 15. In this way, in a state that the detection claws 20 protrude into the inlet hole 3, the retainer 10 is attached to the pipe joint body 2 at the temporary engaging position (FIG. 5).

The pipe joint in the aforementioned temporary engaging state is transported to a work site for connecting with the pipe P, a tube or the like. As described above, the leading end portions of the engaging legs 16 and the holding surface 30 are held outside of the passing area of the bulge portion 1 of the pipe P, and therefore, when the pipe P is inserted to reach the fixing position, the bulge portion 1 does not interfere with the engaging legs 16 and the holding surface 30 and slidably contacts with the guide surfaces 32 of the detection claws 20. When the bulge portion 1 slidably contacts with and presses against the guide surfaces 32, both of the detection legs 19 are deformed to bend in a direction for spreading the legs, so that the detection claws 20 release engagement between the temporary engaging projections 22 and the hook edges 21 and move outwardly from the temporary engaging holes 15. In this case, engagement between the restricting surfaces 27 and the circumferential edges of the temporary engaging holes 15 is also released, so that the retainer 10 is allowed to move to the regular engaging position. However, when the inserting operation is stopped before the pipe P reaches the fixing position, the restricting surfaces 27 continue to engage with the circumferential edges of the temporary engaging holes 15, so that it is not able to move the retainer 10 to the regular engaging position. With this, an operator finds whether the pipe P is inserted to reach the fixing position or not.

In this way, after the pipe P has been inserted to reach the fixing position, moving the retainer 10 to the regular engaging position causes the regular engaging edges 24 of the detection claws 20 to engage with the regular engaging projections 23, respectively, so that the retainer 10 is held in the regular engaging position. In this state, both of the engaging legs 16 and the holding surface 30 engage with a rear surface side of the bulge portion 1 of the pipe P, so that the pipe P is held within the inlet hole 3. In addition, when the retainer 10 is in the regular engaging position, the cutout concave portion 31 fits with the connecting piece 13, so that the retainer 10 cannot easily leave from the regular engaging position, and thus the retainer 10 is certainly held in the regular engaging position.

Incidentally, in this embodiment, in a part of the pipe joint body 2 located between the flanges 9A and 9B, the retainer attaching holes 12 and the temporary engaging holes 15 are formed symmetrically with respect to both of the X axis and the Y axis. Therefore, heat shrinkage of the pipe joint body 2 after molding is equalized compared with a case that open regions are unevenly located as in a known arrangement. Accordingly, it is not necessary to design the molding pin for the inlet hole 3 with uneven heat shrinkage in mind, and the molding pin for molding the inlet hole 3 can have a substantially perfect circular shape. In this way, the molding pin is easy to manufacture.

In addition, the retainer attaching holes 12 are set at symmetric positions, so that it is able to change the attaching direction of the retainer 10 by selecting any one of them depending on usage environment of the pipe joint. Therefore, it is not necessary to prepare pipe joint bodies 2, to which the retainer 10 can be attached from different directions as in a known arrangement. Furthermore, the temporary engaging holes 15 are commonly used when the retainer 10 is attached from either direction, so that the number of openings formed in the pipe joint body 2 can be reduced, and thus it is able to prevent decrease of strength of the pipe joint body 2.

Second and third embodiments of the present invention will be described below in reference to FIGS. 11-17. In addition, the embodiments are modifications of the first embodiment, so that members similar to those of the above embodiment are labeled with the same reference numbers, and their explanations are omitted.

Figure 11:
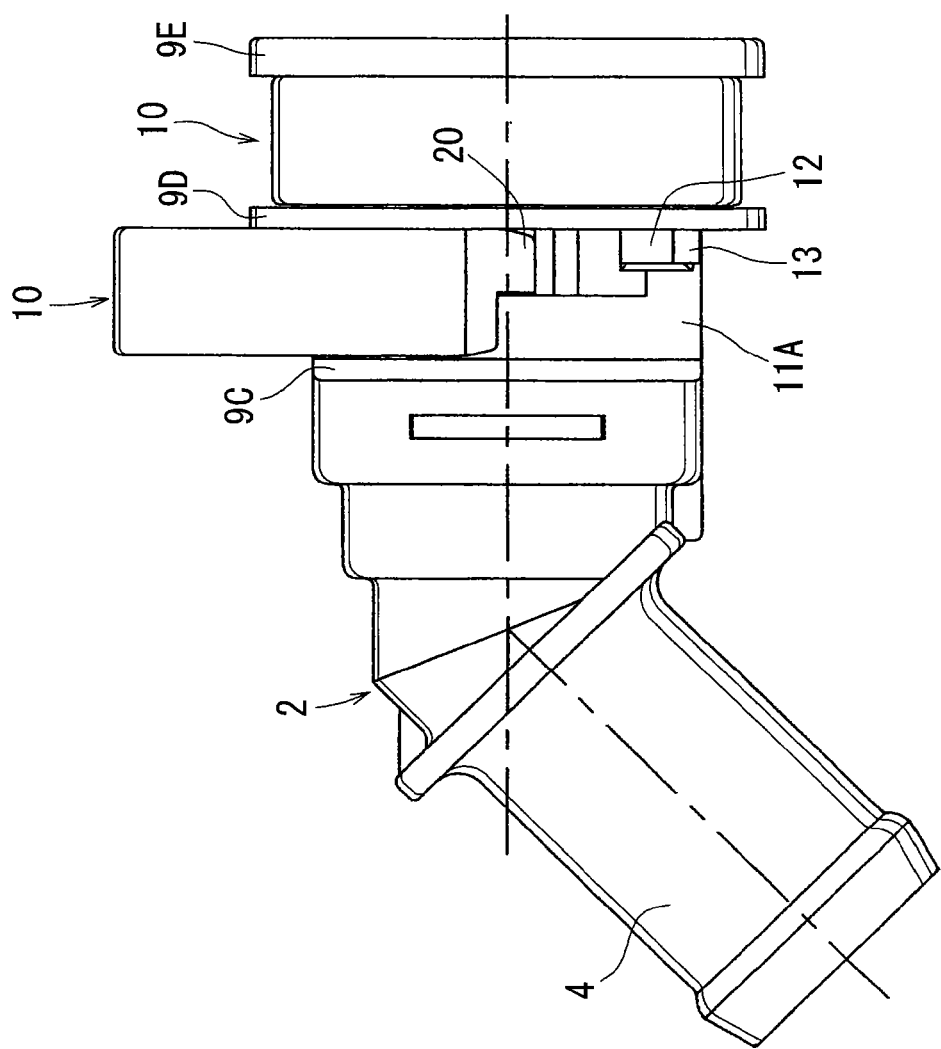
FIG. 11 is a side view of a pipe joint according to a second embodiment as viewed when a retainer is in a temporary engaging position.
Figure 12:
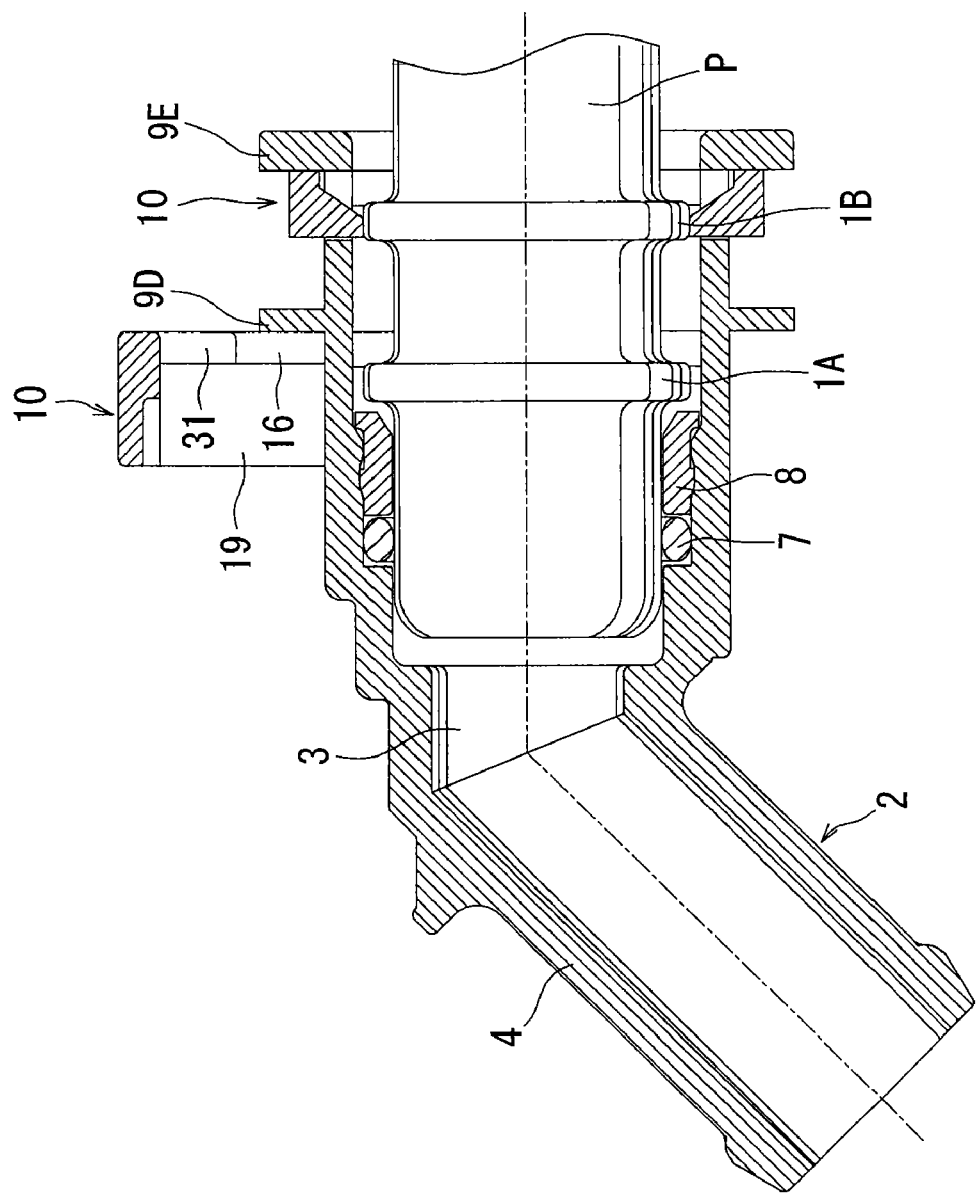
FIG. 12 is a side sectional view taken along line (12)-(12) in FIG. 13 as viewed when the retainer is in the temporary engaging position.
Figure 13:
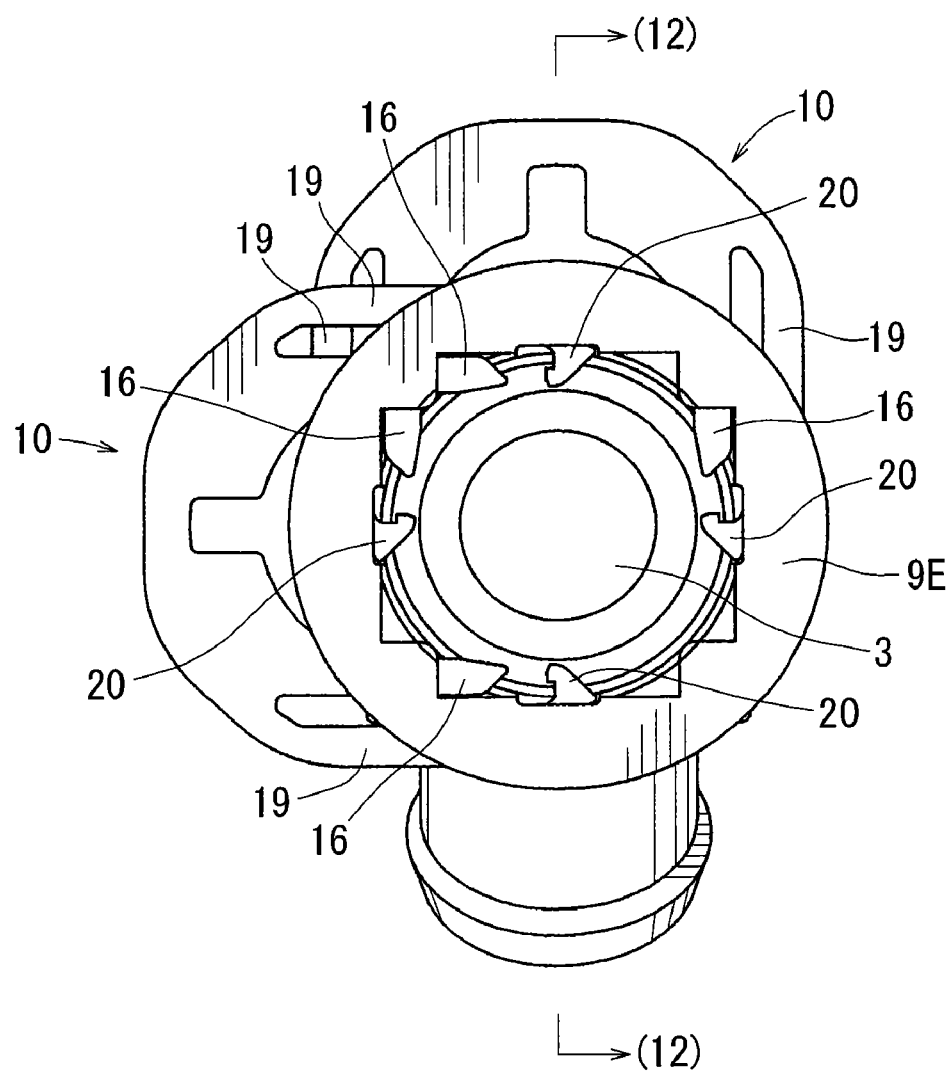
FIG. 13 is a front view of the pipe joint as viewed when the retainer is in the temporary engaging position.
Figure 14:
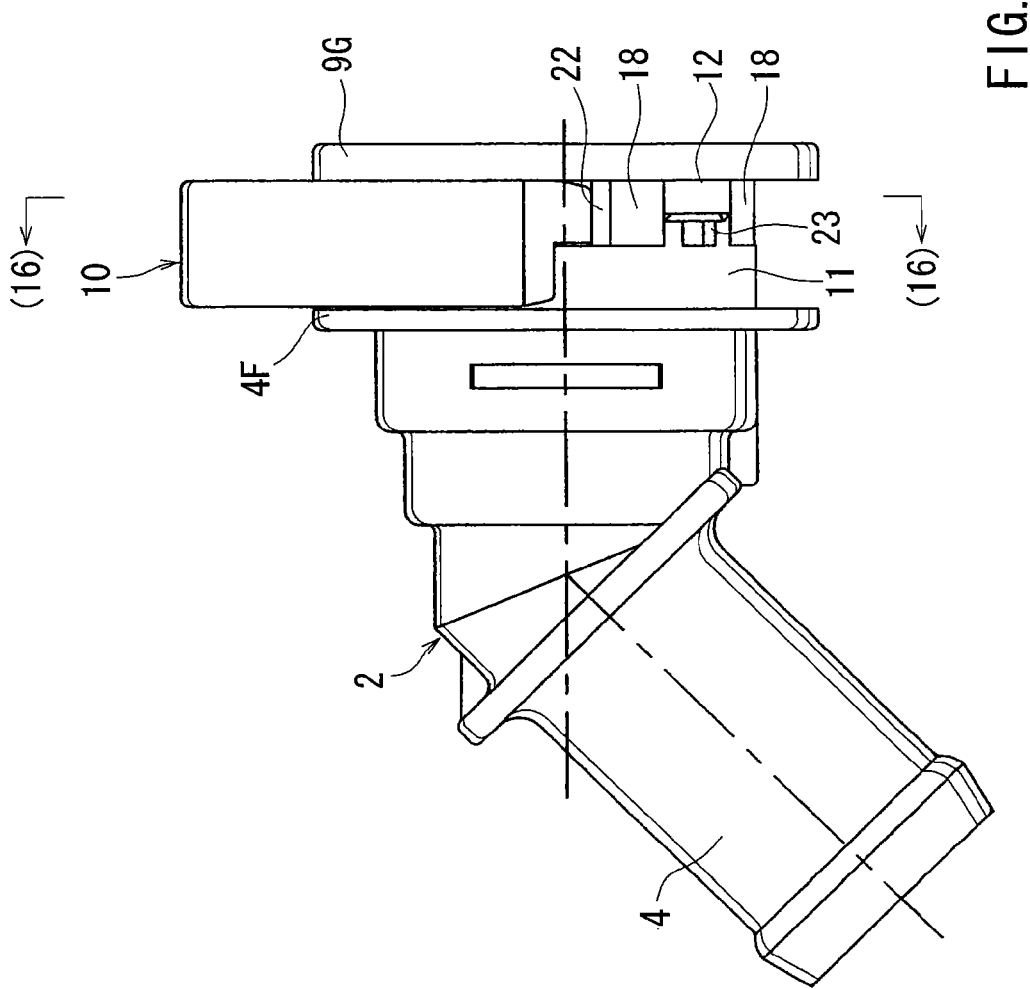
FIG. 14 is a side view of a pipe joint according to a third embodiment as viewed when a retainer is in a temporary engaging position.
Figure 15:
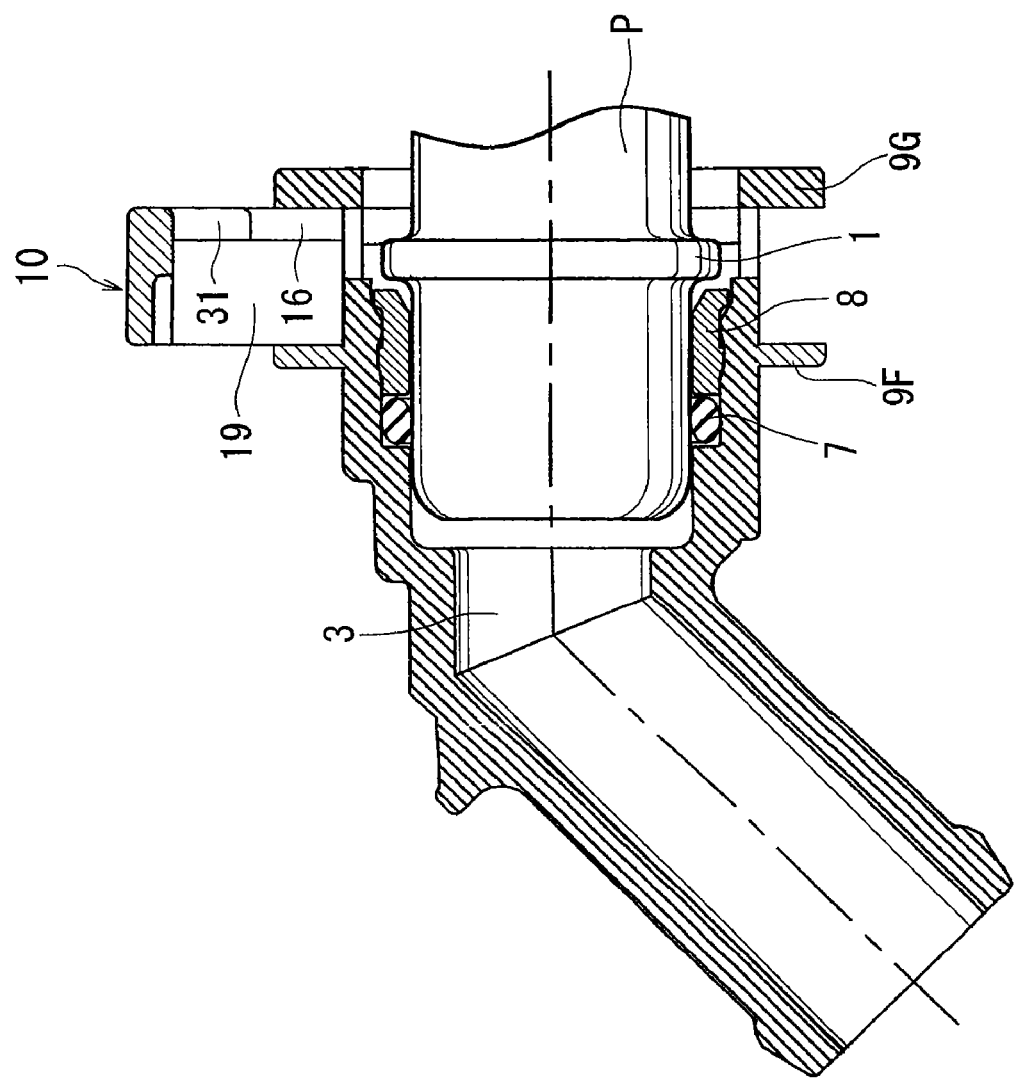
FIG. 15 is a side sectional view of the pipe joint as viewed when the retainer is in the temporary engaging position.
Figure 16:
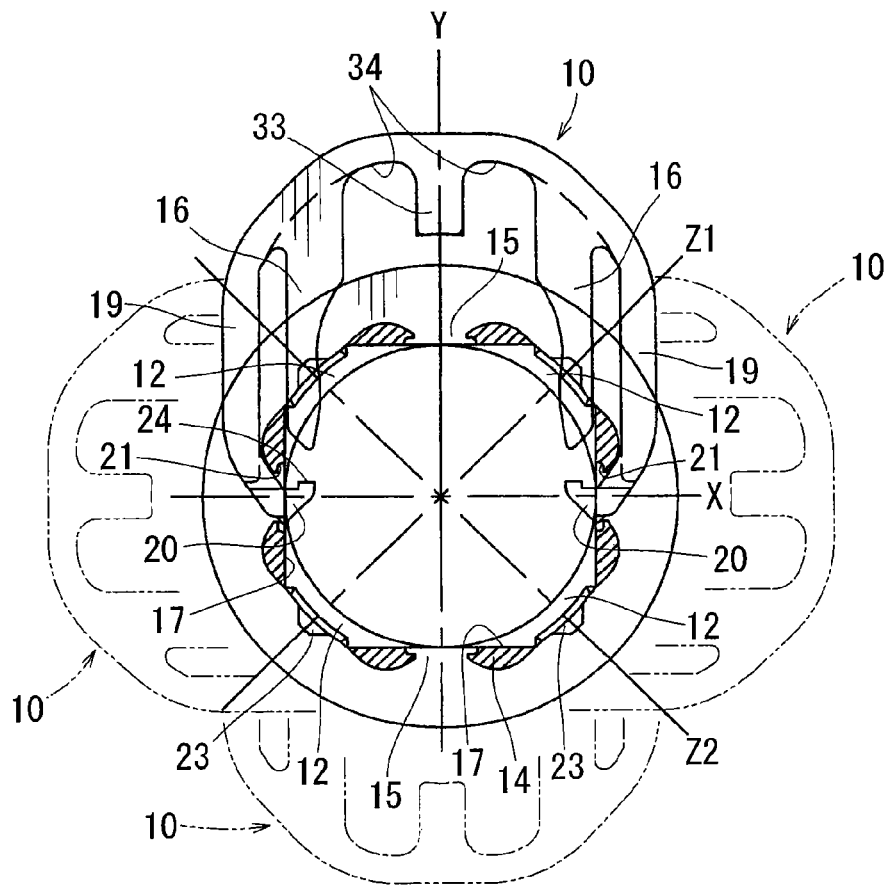
FIG. 16 is a front sectional view of the pipe joint taken along line (16)-(16) in FIG. 14 as viewed when the retainer is in the temporary engaging position.
Figure 17:
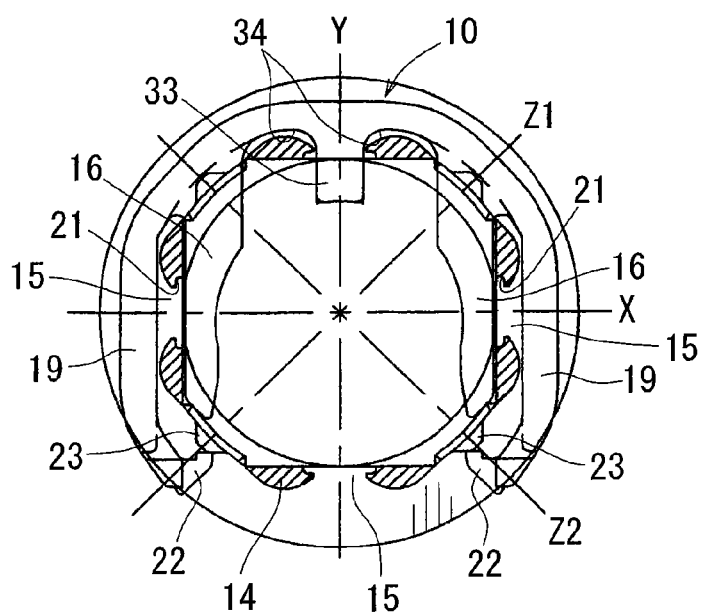
FIG. 17 is a front sectional view of the pipe joint as viewed when the retainer is in a regular engaging position.

FIGS. 11-13 show the second embodiment of the present invention. The pipe joint body 2 has one retainer attaching portion 11 in the first embodiment, however the pipe joint body 2 has two retainer attaching portions 11A and 11B in the second embodiment. That is, three flanges 9C, 9D and 9E are formed so as to extend on the outer surface of the pipe joint body 2 at the same intervals, the retainer attaching portions 11A and 11B are defined in an area located between the flanges 9C and 9D and an area located between the flanges 9D and 9E, respectively. The retainer 10 can be attached to the corresponding retainer attaching portions 11A and 11B from opposite two directions, respectively. As shown in FIG. 13, in this embodiment, attaching directions of the two retainers 10 are set at approximately 90 degrees about the axis direction of the inlet hole, so that it is able to attach the retainer 10 from right, left, upper and lower directions in FIG. 13.

In addition, the pipe P has two bulge portions 1A and 1B, so that the retainer 10 can engage with the pipe P via the corresponding bulge portion in any of the retainer attaching portions.

Other constructions of the second embodiment are same as those of the first embodiment, so that the second embodiment can achieve same operations and effects as the first embodiment. In addition, the pipe joint body 2 of the first embodiment allows the retainer 10 to be attached from two directions. However, in this embodiment, it is able to select the attaching direction of the retainer 10 from four directions. Accordingly, this pipe joint can be used in usage environments where the pipe joint of the first embodiment cannot be used, and thus necessity for producing pipe joints depending on the using site becomes further decreases.

FIG. 14 through FIG. 17 show a third embodiment of the present invention. In the third embodiment, the pipe joint body 2 has four temporary engaging holes 15 and four retainer attaching holes 12 on a cross section perpendicular to the axis of the pipe joint body 2 shown in FIGS. 16 and 17, respectively. In the cross section, the four temporary engaging holes 15 are formed on the X axis and the Y axis perpendicular to each other. Whereas, the four retainer attaching holes 12 are located on a Z1 axis and a Z2 axis having phase differences at 45 degrees relative to the X axis and the Y axis, respectively. A pair of the side wall portions 14 are formed on opposite sides of all of the temporary engaging hole 15, respectively. A guide surface 17 for guiding an attaching operation of the retainer 10, i.e., movement to the regular engaging position in a state of slidably contacting with or being adjacent to the outer surface of the engaging leg 16 is formed on an inner surface of each side wall 14, and the guide surface 17 extends parallel to the X axis or the Y axis. In addition, flanges 9F and 9G defining attaching portions for the retainer 10 are formed into substantially circular shapes and guide for attachment of the retainer when the retainer is attached from any direction.

A projection 33 is formed in a central region of the retainer 10, and a pair of concave portions 34 are formed on both sides of it. When the retainer 10 is in the regular engaging position, the projection 33 fits with the corresponding temporary engaging hole 15, and the pair of the concave portions 34 simultaneously fit with the corresponding two side wall portions 14, respectively, so that the retainer is positioned at the regular engaging position. In addition, four regular engaging projections 23 are formed in an opposed manner on the Z1 axis and the Z2 axis and are configured to engage with the detection claws 20 of the retainer attached from either of directions along the X axis and the Y axis. Accordingly, when the retainer 10 is in the regular engaging position, the regular engaging edges 24 of the detection claws 20 engage with the corresponding regular engaging projections 23, respectively, so that the retainer 10 is prevented from unintentionally leaving from the regular engaging position.

Other constructions of the third embodiment are same as those of the first embodiment, so that the third embodiment can achieve operations and effects same as the first embodiment. In addition, the attaching direction can be selected from four directions in the same manner as the second embodiment, so that it is not necessary to manufacture pipe joints depending on installation location. Furthermore, because the four retainer attaching holes 12 and the four temporary engaging holes 15 are formed at same intervals in the circumferential direction, influence of heat shrinkage after molding is less compared with known pipe joints, and the design of the pipe joint becomes easier.

The present invention is not limited to the embodiments explained by the above description and the drawings, and for example, the following embodiment is included in a technical scope of the present invention, and in addition, it can be carried out with various modifications other than the following within the scope without departing from the gist.

In the above embodiments, there have been shown the cases that the retainer attaching holes 12 are disposed at two or four positions. However, the number of dispositions should not be limited, and it may be configured such that three positions are disposed at same intervals in the circumferential direction.

The invention claimed is:

1. A pipe joint comprising:
a pipe joint body made from synthetic resin, in which an inlet hole sized to allow a pipe body to be inserted therein is formed along an axis, and retainer attaching holes communicating with the inlet hole and temporary engaging holes communicating with the inlet hole open at a side surface; and
a retainer attached to the retainer attaching hole from a direction intersecting with the axis and configured to be engaged with and disengaged from the pipe body as the retainer is inserted into and removed from the inlet hole;
wherein, on the side surface of the pipe joint body, a plurality of open regions including the retainer attaching holes are disposed on substantially symmetric positions about the axis;
wherein each of the open regions is formed to have the same shape as the retainer attaching holes, so that the retainer can be attached to any of the open regions whereby the retainer can be attached to the pipe joint body from different positions;
wherein detection claws are formed on the retainer;
wherein the side surface includes plural pairs of lead surfaces, each pair of lead surfaces being disposed at a region adjacent to each temporary engaging hole, the lead surfaces in each pair being positioned adjacent to each of the temporary engaging holes on opposite sides thereof in a circumferential direction of the side surface of the pipe joint body, the lead surfaces in each pair facilitating movement of one of the detection claws to the temporary engaging hole positioned between the lead surfaces, so that the temporary engaging holes can temporarily engage the detection claws when the retainer is attached from any one of the opposite sides to the corresponding retainer attaching hole.

2. The pipe joint as in claim 1, wherein:
adjoining edges of the retainer attaching holes and the open regions are connected by connecting pieces, respectively, and a concave portion fitting with the connecting segment for positioning the retainer is formed on the retainer.

3. The pipe joint as in claim 2, in combination with the pipe body for which the inlet hole of the pipe joint body is sized.

4. The pipe joint as in claim 1, wherein:
with respect to any of the retainer attaching holes and the open regions, the retainer can move between a temporary engaging position for enabling the pipe body to be inserted into and removed from the inlet hole, and a regular engaging position for holding the pipe body in the inlet hole by engaging with a bulge portion;
wherein the detection claws are formed on leading ends of a pair of holding legs flexibly formed on the retainer
when the retainer is in the temporary engaging position, the pair of the detection claws protrude into the inlet hole through the pair of temporary engaging holes open in the pipe joint body, and when the pipe body is inserted into the inlet hole, the detection claws slidably contact with the bulge portion formed on an outer surface of the pipe body to extend therefrom and retract outwardly from the temporary engaging holes in order to allow movement of the retainer from the temporary engaging position to the regular engaging position;
the temporary engaging holes are formed in the pipe joint body to be opposed in a direction of a diameter, and the open regions and the retainer attaching holes are disposed symmetrically with respect to the diameter as an axis, so that when any of the retainer attaching holes and the open regions is selected, the detection claws are fitted into the temporary engaging holes in order to hold the retainer in the temporary engaging position.

5. The pipe joint as in claim 4, in combination with the pipe body for which the inlet hole of the pipe joint body is sized.

6. The pipe joint as in claim 1, in combination with the pipe body for which the inlet hole of the pipe joint body is sized.

* * * * *